US012656852B2

(12) United States Patent
Shah et al.

(10) Patent No.: US 12,656,852 B2
(45) Date of Patent: Jun. 16, 2026

(54) ADAPTIVE SELECTION OF PROCESSOR IDLE GOVERNORS

(71) Applicant: QUALCOMM Incorporated, San Diego, CA (US)

(72) Inventors: Maulik Shah, Hyderabad (IN); Rupendra Karri, Peddapuram (IN); Dinesh Kumar Choudhary, Tonk (IN); Srinivas Rao Lengamaneni, Hyderabad (IN); Nirav Narendra Desai, Hyderabad (IN); Raja Simha Revanuru, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 18/812,855

(22) Filed: Aug. 22, 2024

(65) Prior Publication Data

US 2026/0056598 A1     Feb. 26, 2026

(51) Int. Cl.
*G06F 1/32*      (2019.01)
*G06F 1/3228*      (2019.01)
*G06F 1/3234*      (2019.01)

(52) U.S. Cl.
CPC .......... *G06F 1/3243* (2013.01); *G06F 1/3228* (2013.01)

(58) Field of Classification Search
CPC ..................................... G06F 1/32; G06F 9/44
See application file for complete search history.

(56) References Cited

U.S. PATENT DOCUMENTS

2015/0169029 A1*  6/2015  Tian ..................... G06F 1/3218
                                                               713/300
2025/0110536 A1*  4/2025  Kim ........................ G06F 1/26

OTHER PUBLICATIONS

Antoniou G., et al., "Agile C-States: A Core C-State Architecture for Latency- Critical Applications Optimizing Both Transition and Cold-Start Latency", ACM Transactions on Architecture and Code Optimization, Association for Computing Machinery, US, Jul. 2, 2024, pp. 1-25.
Chou C-H., et al., "[mu] DPM: Dynamic Power Management for the Microsecond Era", 2019 IEEE International Symposium on High Performance Computer Architecture (HPCA), IEEE, Feb. 16, 2019, pp. 120-132.
International Search Report and Written Opinion—PCT/US2025/038935—ISA/EPO—Nov. 5, 2025.
Sharafzadeh E., et al., "Yawn: A CPU Idle-State Governor for Datacenter Applications", Systems, ACM, 2 Penn Plaza, Suite 701, New York, Aug. 19, 2019, pp. 91-98.

* cited by examiner

*Primary Examiner* — Keshab R Pandey
(74) *Attorney, Agent, or Firm* — Seyfarth Shaw LLP

(57)      ABSTRACT
A method includes registering a set of central processing unit (CPU) idle governors. The method also includes selecting at boot time, for each CPU of a set of CPUs, an initial CPU idle governor from the set of CPU idle governors based on an initial rating associated with each idle governor. The method further includes selecting during run time, for each CPU of the set of CPUs, an updated CPU idle governor from the set of CPU idle governors based on at least one CPU input of a set of CPU inputs associated with each CPU.

20 Claims, 7 Drawing Sheets

100

500

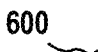

600

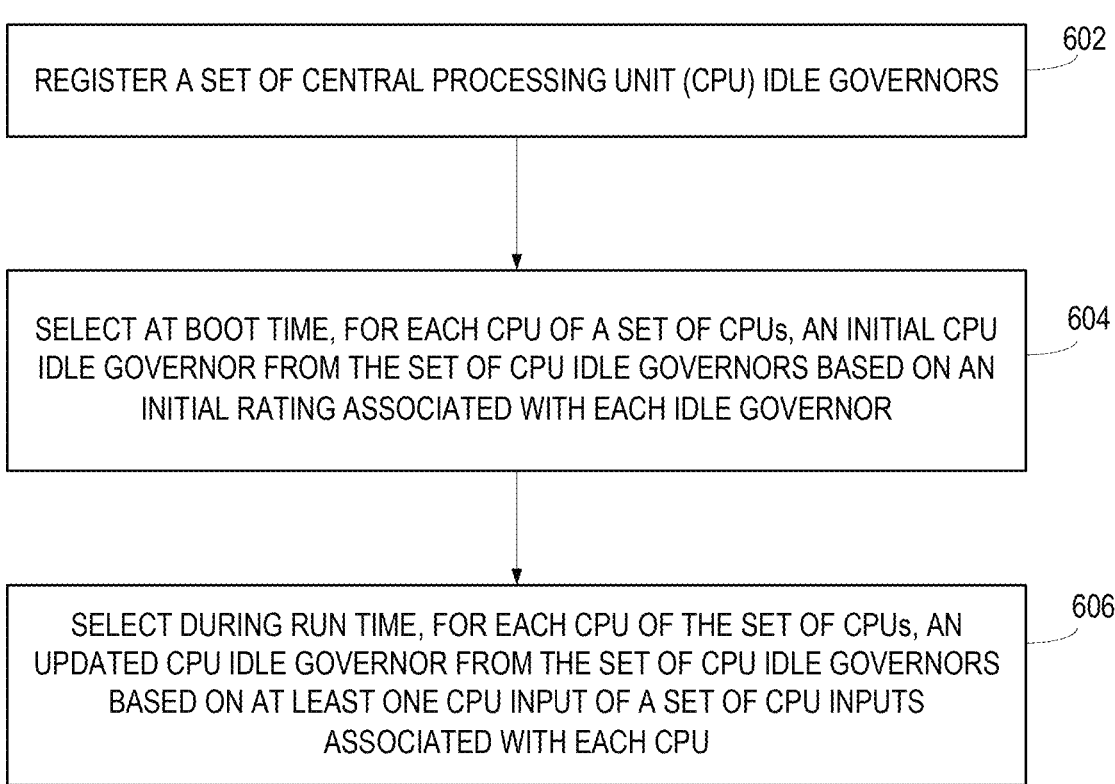

REGISTER A SET OF CENTRAL PROCESSING UNIT (CPU) IDLE GOVERNORS ⟋ 602

SELECT AT BOOT TIME, FOR EACH CPU OF A SET OF CPUs, AN INITIAL CPU IDLE GOVERNOR FROM THE SET OF CPU IDLE GOVERNORS BASED ON AN INITIAL RATING ASSOCIATED WITH EACH IDLE GOVERNOR ⟋ 604

SELECT DURING RUN TIME, FOR EACH CPU OF THE SET OF CPUs, AN UPDATED CPU IDLE GOVERNOR FROM THE SET OF CPU IDLE GOVERNORS BASED ON AT LEAST ONE CPU INPUT OF A SET OF CPU INPUTS ASSOCIATED WITH EACH CPU ⟋ 606

ADAPTIVE SELECTION OF PROCESSOR IDLE GOVERNORS

FIELD OF THE DISCLOSURE

Aspects of the present disclosure generally relate to computer processors and processor idle states, and more particularly to adaptive selection of processor idle governors.

BACKGROUND

Central processing unit (CPU) idle governors are components in modern computing systems that manage CPU power consumption by controlling the transition between processor active states and various idle states, referred to as "C-states." A purpose of idle governors is to reduce system energy consumption during processor downtime while maintaining system responsiveness. To balance energy consumption and responsiveness, idle governors decide both the timing of the CPU's entry into an idle state and the idle state which the CPU enters. By utilizing predictive techniques, idle governors make intelligent decisions that help extend battery life, reduce heat generation, and lower overall energy costs.

An operating system kernel handles selection of idle governors at boot time. During system initialization, the kernel evaluates available hardware and firmware capabilities of the CPU, along with any user-specified configurations, to choose an appropriate idle governor. This selection may be influenced by several factors, including the current workload, desired power management policies, and system latency specifications. For example, a system prioritizing energy efficiency might opt for a menu governor, known for its predictive capabilities and ability to handle varied workloads. Conversely, a system specifying low latency might select a ladder governor for the ladder governor's more basic and faster decision-making process. Users may also manually specify the desired governor through kernel parameters or configuration files.

SUMMARY

In aspects of the present disclosure, a method includes registering a set of central processing unit (CPU) idle governors. The method also includes selecting at boot time, for each CPU of a set of CPUs, an initial CPU idle governor from the set of CPU idle governors based on an initial rating associated with each idle governor. The method further includes selecting during run time, for each CPU of the set of CPUs, an updated CPU idle governor from the set of CPU idle governors based on at least one CPU input of a set of CPU inputs associated with each CPU.

Other aspects of the present disclosure are directed to an apparatus. The apparatus has a memory and one or more processors coupled to the memory. The processor(s) is configured to register a set of central processing unit (CPU) idle governors. The processor(s) is also configured to select at boot time, for each CPU of a set of CPUs, an initial CPU idle governor from the set of CPU idle governors based on an initial rating associated with each idle governor. The processor(s) is further configured to select during run time, for each CPU of the set of CPUs, an updated CPU idle governor from the set of CPU idle governors based on at least one CPU input of a set of CPU inputs associated with each CPU.

In other aspects of the present disclosure, a non-transitory computer-readable medium with program code recorded thereon is disclosed. The program code is executed by a processor and includes program code to register a set of central processing unit (CPU) idle governors. The program code also includes program code to select at boot time, for each CPU of a set of CPUs, an initial CPU idle governor from the set of CPU idle governors based on an initial rating associated with each idle governor. The program code further includes program code to select during run time, for each CPU of the set of CPUs, an updated CPU idle governor from the set of CPU idle governors based on at least one CPU input of a set of CPU inputs associated with each CPU.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 6 is a flowchart illustrating an example process performed for adaptive selection of CPU idle governors, in accordance with various aspects of the present disclosure.

DETAILED DESCRIPTION

Figure 1:
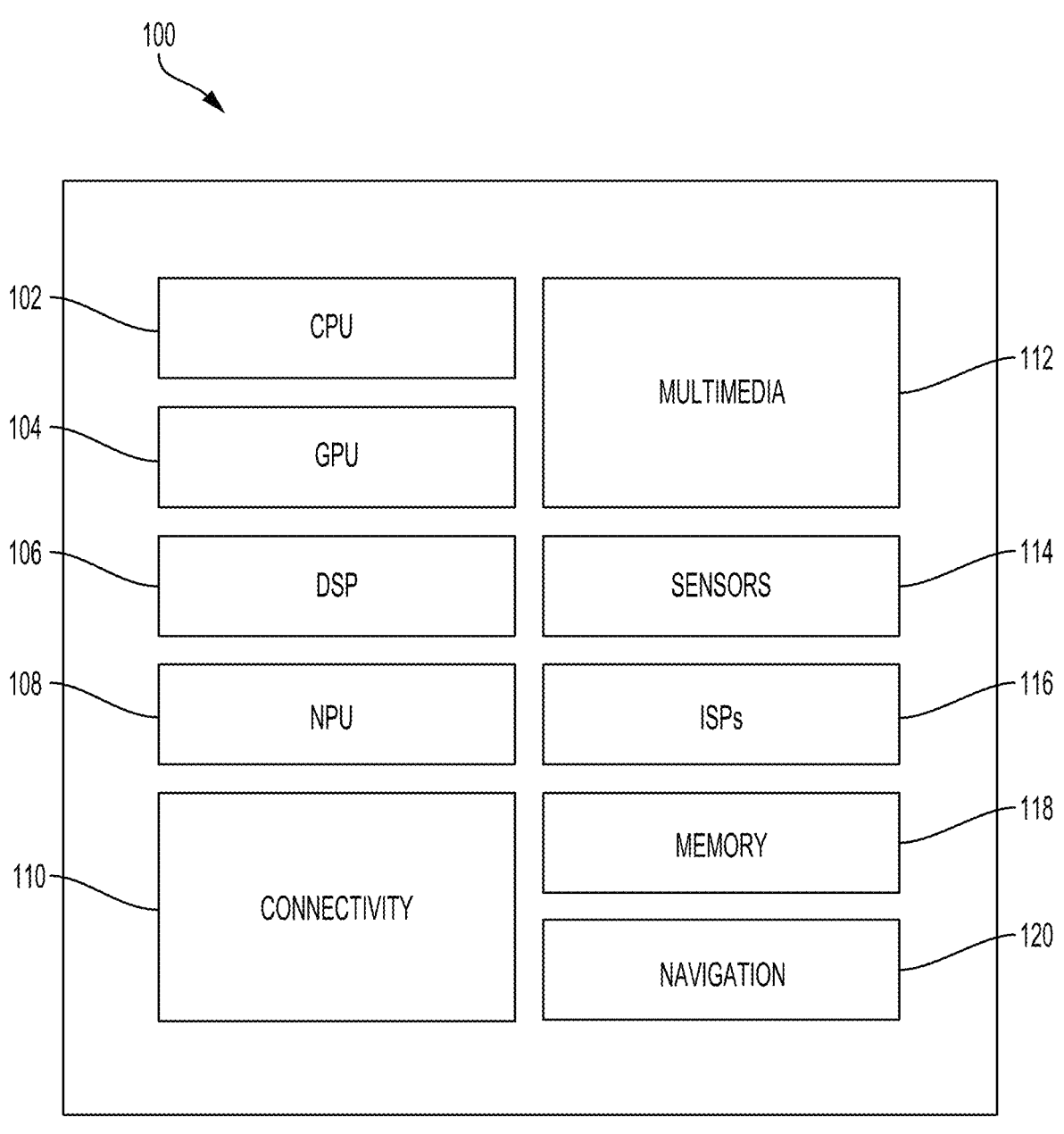
FIG. 1 is a block diagram illustrating an example implementation of a system-on-a-chip (SOC), in accordance with various aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks, and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Several aspects of processor idle governors will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

As described, modern computing systems implement central processing unit (CPU) idle governors, also referred to as idle governors or governors. Idle governors manage CPU power consumption by controlling the CPU's transition between active states and various idle states, known as "C-states." Idle states may also be applicable to CPU clusters. These cluster-level idle states may be referred to as "D-states." The primary purpose of idle governors is to balance system energy consumption during processor downtime and system responsiveness. To achieve this purpose, idle governors implement predictive techniques to make intelligent decisions that extend battery life, reduce heat generation, and lower overall energy costs. Idle governor selection is handled by the operating system kernel at boot time based on a fixed rating provided for each available idle governor.

However, conventional methods of CPU idle governor management present several challenges. These methods select a single idle governor for each CPU at boot time based on a static rating provided for candidate idle governors, and do not dynamically change the idle governor at run time. The system therefore cannot effectively cater to a variety of use cases. Furthermore, conventional idle governor selection techniques do not properly account for many relevant factors during the selection process, such as hardware input, CPU frequency, and battery state. As a result, conventional idle governor selection techniques do not adapt based on these factors. This lack of adaptability and consideration of relevant factors may lead to reduced performance. Therefore, it would be desirable to improve CPU idle governor management.

Various aspects of the present disclosure are directed to adaptive selection of CPU idle governors. In some aspects, a system registers a set of available idle governors, the system including multiple CPUs. At boot time, the system assigns an idle governor to each CPU based on initial ratings associated with each idle governor of the set of available idle governors. At run time, the system selects an updated idle governor for each CPU based on one or more inputs. The inputs may include CPU type, CPU frequency, CPU hardware input, CPU utilization, CPU private cache size, cluster cache hit and miss ratio, application execution context, sleep length, and/or battery state. The system then implements the selected idle governor for each CPU and may periodically update the idle governors based on received input.

Particular aspects of the subject matter described in this disclosure can be implemented to realize one or more of the following potential advantages. In some examples, the described techniques, such as dynamically updating idle governors based on received input enables systems to adapt to use cases during run time. Further, the described techniques may reduce processor and cluster sleep time, improving overall system power consumption. Because each of the idle governors implements differing idle state selection strategies, the conventional technique of assigning a single idle governor to all CPUs cannot serve a wide variety of use cases to achieve better power savings. Instead, assigning different idle governors for different CPUs may achieve better power savings while maintaining performance.

FIG. 1 is a block diagram illustrating an example implementation of a system-on-a-chip (SOC) 100, which may include a central processing unit (CPU) 102 or a multi-core CPU configured for idle governor management. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM, RISC-V (RISC-five), or any reduced instruction set computing (RISC) architecture. In aspects of the present disclosure, the instructions loaded into the CPU 102 may include code to register a set of central processing unit (CPU) idle governors. The instructions loaded into the CPU 102 may include code to select at boot time, for each CPU of a set of CPUs, an initial CPU idle governor from the set of CPU idle governors based on an initial rating associated with each idle governor. The instructions loaded into the CPU 102 may include code to selecting during run time, for each CPU of the set of CPUs, an updated CPU idle governor from the set of CPU idle governors based on at least one CPU input of a set of CPU inputs associated with each CPU.

According to aspects of the present disclosure, an apparatus includes means for registering, and means for selecting. In other aspects, the aforementioned means may be any structure or any material configured to perform the functions recited by the aforementioned means.

Various aspects of the present disclosure are directed to CPU idle governors, also referred to as idle governors or governors. As discussed, CPU idle governors are components in modern computing systems that manage processor power consumption by controlling the transition between processor active states and various idle states, referred to as "C-states." Conventional techniques select a CPU idle governor at boot time based on a static rating provided for candidate CPU idle governors. The selected CPU idle governor manages each CPU in a system. However, because the system implements a single CPU idle governor for each CPU and does not dynamically change the CPU idle governor, the system cannot effectively cater to a variety of performance and power centric use cases.

Conventional CPU idle governor selection techniques also do not account for many important factors during the idle governor selection process. For example, conventional CPU idle governor selection does not properly account for factors such as hardware input, foreground/background application execution context, CPU count, current CPU frequency, and battery state. Conventional CPU idle governor selection techniques do not adapt based on these factors by dynamically modifying selection methodology to give better performance per watt.

Some conventional approaches attempt to address the problems associated with static CPU idle governor selection. For example, one conventional approach includes assigning a combination of CPU idle governors to each CPU, the combination of CPU idle governors combining the best aspects of available idle governors. In practice, however, this combination of CPU idle governors is too complex to effectively manage CPU idle states. For instance, when a CPU enters an idle state, the combination of idle governors wastes a large amount of time and power to select the type of idle state to enter. Therefore, a lightweight solution is specified for improving CPU idle governor selection.

Figure 2:
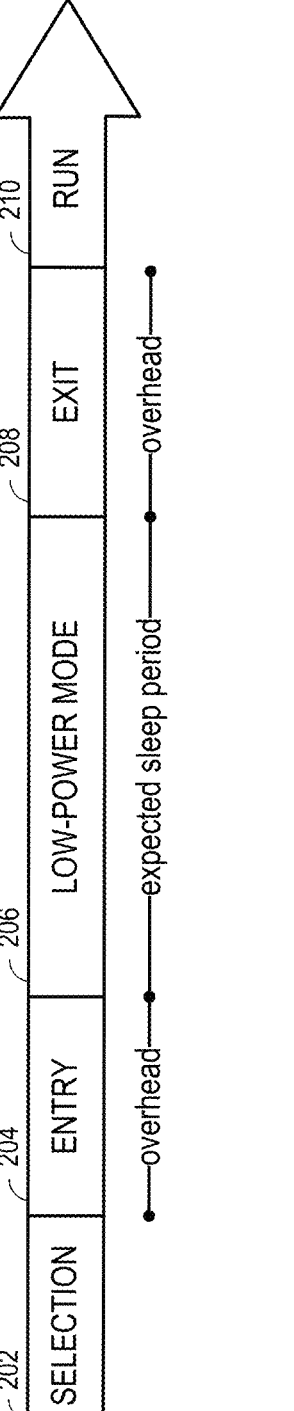
FIG. 2 illustrates an idle state timeline.

FIG. 2 illustrates an idle state timeline 200. As shown in FIG. 2, the idle state timeline 200 includes a selection period 202, an entry period 204, a low-power mode period 206, an exit period 208, and a run period 210. The idle state timeline 200 may be followed by, for example, a CPU, such as the CPU 102 shown in FIG. 1. As discussed, CPU-level idle states may be referred to as "C-states," while cluster-level idle states may be referred to as "D-states."

During the selection period 202, an idle governor evaluates a current workload and system parameters, such as quality of service and known timer events, to determine an idle state. The governor implements predictive techniques to estimate the duration of CPU idle time and selects an appropriate C-state based on power-saving potential and wake-up latency. Each available C-state includes a tradeoff between latency and power savings. For example, a C4 state specifies a deeper idle state than a C1 state. A CPU in a C4 idle state, therefore, saves more power but specifies longer idle state entry and exit latency compared to a CPU in a C1 idle state. At the entry period 204, the CPU transitions from a current active state into the chosen idle state. To begin the idle state, the CPU enters the low-power mode 206 by saving current context, disabling certain internal components, and reducing clock speed.

During the low-power mode 206, the CPU remains in the selected idle state, consuming less power compared to an active state. The CPU may remain in the selected idle state for an expected sleep period. After the expected sleep period has passed, the CPU exits the idle state during the exit period 208. Sometimes, an unexpected event may cause the CPU to exit the idle state before the expected sleep period has passed. For example, the CPU may prematurely exit the idle state during an asynchronous wakeup event caused by an inter-processor interrupt or some other hardware interrupt. The amount of time spent in a sleep period may therefore depend on timer events, inter-processor interrupts, hardware interrupts, and governor predictions.

During the exit period 208, the CPU transitions out of the low-power mode 206 and into the run period 210. The processor restores its context, re-enables disabled components, and increases clock speed to resume normal operation. Both the entry period 204 and the exit period 208 are overhead, meaning the entry period 204 and the exit period 208 incur additional time and computational resources that do not contribute directly to task execution, but are instead used for transitioning the CPU between active and idle states. During the run period 210, the CPU executes instructions in an active state. The idle governor continues to monitor the system's workload and may re-enter the selection period 202 to choose a new C-state.

During the idle state timeline 200, the idle governor aims to increase energy savings in low-power mode while reducing energy overhead. Deeper idle states may reduce power consumption when the CPU is in low-power mode, but deeper idle states also specify more time and energy to enter and exit. The idle governor balances the energy savings from using deeper idle states with the additional transition costs to increase overall system efficiency. By selecting appropriate idle states, the idle governor enhances system performance per watt of power.

Figure 3:
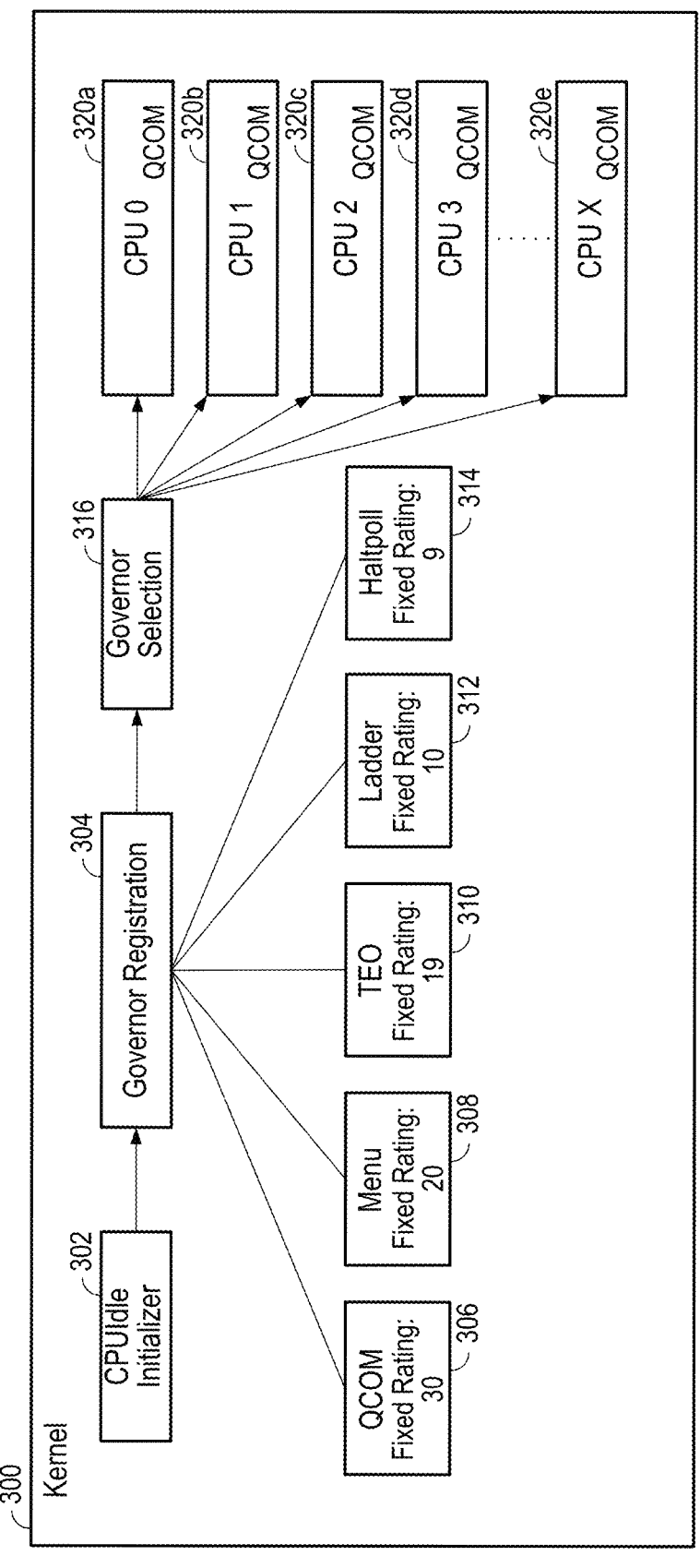
FIG. 3 is a block diagram illustrating a conventional central processing unit (CPU) idle governor selection system.

FIG. 3 is a block diagram illustrating a conventional CPU idle governor selection system. As shown in FIG. 3, a kernel 300 includes various components for governor selection. After boot start, a CPUIdle initializer 302, such as a CPUIdle framework of the kernel 300, initiates the governor selection process during the system bootup phase. Once the CPUIdle initializer 302 begins governor selection, a governor registration component 304 registers the available governors with a CPU idle management subsystem of the operating system. In the example illustrated with respect to FIG. 3, five governors are available: a QCOM governor 306, a menu governor 308, a timer events oriented (TEO) governor 310, a ladder governor 312, and a haltpoll governor 314.

Each of the available governors provides different strengths. For example, the QCOM governor 306 provides more efficient power management that is tailored to hardware features of select processors. The menu governor 308 uses predictive techniques to balance power savings with system responsiveness. The TEO governor 310 focuses on timer events to improve idle period predictions. The ladder governor 312 implements a basic hierarchical approach, making quick decisions to transition through different idle states based on idle du ration. The haltpoll governor 314 excels in virtualized environments, providing a mechanism to handle CPU idleness with reduced overhead in virtual machines. Each governor's suitability depends on use case, workload characteristics, and system specifications.

As shown in FIG. 3, each of the available governors include a fixed rating. The QCOM governor 306 has a fixed rating of 30, the menu governor 308 has a fixed rating of 20, the TEO governor 310 has a fixed rating of 19, the ladder governor 312 has a fixed rating of 10, and the haltpoll governor 314 has a fixed rating of 9. The fixed rating is assigned to each of the available governors at compile-time and determines a selection priority for each of the available governors. The governor selection component 316 selects the available governor having the highest fixed rating and, during the initialization phase of the operating system boot process, assigns the selected governor to all CPUs in the system. In the example illustrated in FIG. 3, the governor selection component 316 selects the QCOM governor 306 and assigns the QCOM governor 306 to each of the CPU 0 320*a*, CPU 1 320*b*, CPU 2 320*c*, CPU 3 320*d*, and CPU X 320*c*.

Each of the available governors may include complex idle state selection logic, making idle state selection demanding in terms of both time and energy. For example, the menu governor 308, the default CPU idle governor for tickless systems, predicts an idle duration to select a CPU idle state. When invoked, the menu governor 308 predicts the idle duration based on the time until the next timer event, referred to as the sleep length, which serves as the upper bound for the next CPU wakeup. The menu governor 308 maintains two arrays of sleep length correction factors: one for CPUs waiting on input/output (I/O) operations and another for CPUs that are not. Each array has correction factors for different sleep length ranges, with each range being approximately 10 times wider than the previous one.

The correction factor for the relevant sleep length range is updated after the CPU wakes up. The closer the sleep length is to the observed idle duration, the closer the correction factor is to 1. The menu governor 308 multiplies the sleep length by the correction factor to obtain the first approximation of the predicted idle duration. The menu governor 308 refines the prediction using a pattern recognition technique. The menu governor 308 then saves the last eight observed idle durations, computes their average and variance, and if the variance is small, the average is considered the "typical interval." If the variance is not small, the menu governor 308 discards the longest value, and the process repeats until the typical interval is determined or assumed to be "infinity." The predicted idle duration is the minimum of this interval and the sleep length multiplied by the correction factor.

The menu governor 308 computes an extra latency limit to help interactive workloads. If the exit latency of the selected idle state is comparable to the predicted idle duration, the menu governor 308 may avoid the selected idle state to reduce overhead. The initial latency limit is the predicted idle duration divided by a factor depending on the number of I/O-waiting tasks. The menu governor 308 compares the result with a latency limit from a power management quality of service (PM QoS) framework, and the menu governor 308 uses the minimum value as the limit for idle state exit latency. Finally, the menu governor 308 walks through the list of idle states, comparing each state's target residency with the predicted idle duration and the state's exit latency with the computed limit. The menu governor 308 selects the state with a target residency closest to, but below, the predicted idle duration and an exit latency within the limit.

The other available governors may implement different but similarly complex idle state selection methodologies. For instance, the TEO governor 310 is based on the observation that, in many systems, timer events occur at a frequency two or more orders of magnitude higher than any other interrupts, making timer events the most significant cause of CPU wakeups from idle states. The QCOM governor 306 attempts to balance power and performance by observing past idle state durations.

Figure 4:
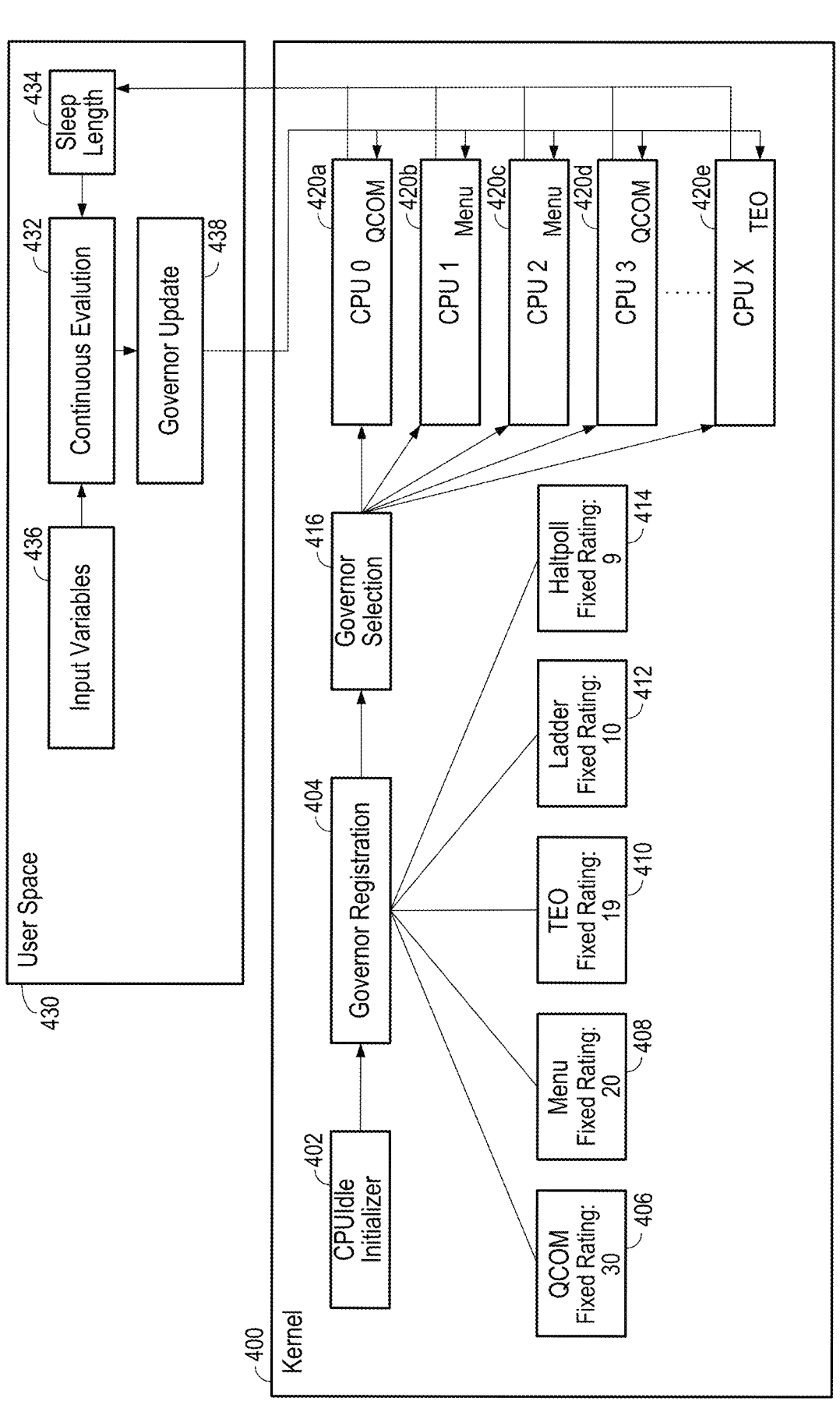
FIG. 4 is a block diagram illustrating an adaptive CPU idle governor selection system, in accordance with various aspects of the present disclosure.

FIG. 4 is a block diagram illustrating an adaptive CPU idle governor selection system, in accordance with various aspects of the present disclosure. As shown in FIG. 4, a kernel 400 includes various components for governor selection. During the system bootup phase, components of the kernel 400 perform governor selection techniques similar to components of the kernel 300 illustrated with respect to FIG. 3. After boot start, a CPUIdle initializer 402, such as a CPUIdle framework of the kernel 400, initiates the governor selection process during the system bootup phase. Once the CPUIdle initializer 402 begins governor selection, a governor registration component 404 registers the available governors with a CPU idle management subsystem of the operating system. In the example illustrated in FIG. 4, five idle governors are available: a QCOM governor 406, a menu governor 408, a TEO governor 410, a ladder governor 412, and a haltpoll governor 414.

As shown in FIG. 4, each of the available governors includes a fixed rating. The QCOM governor 406 has a fixed rating of 30, the menu governor 408 has a fixed rating of 20, the TEO governor 410 has a fixed rating of 19, the ladder governor 412 has a fixed rating of 10, and the haltpoll governor 414 has a fixed rating of 9. The fixed rating is assigned to each of the available governors at compile-time and determines an initial selection priority for each of the available governors. The governor selection component 416 selects the available governor having the highest fixed rating and, during the initialization phase of the operating system's boot process, assigns the selected governor to all CPUs in the system. Because the QCOM governor 406 has the highest fixed rating, the governor selection component 416 selects the QCOM governor 406 and assigns the QCOM governor 406 to each of the CPU 0 420*a*, CPU 1 420*b*, CPU 2 420*c*, CPU 3 420*d*, and CPU X 420*c*.

FIG. 4 also shows a user space 430. While the kernel 400 is the core part of the operating system that manages system resources and hardware at a low level, the user space 430 is an environment hosting user applications. The user space 430 includes a continuous evaluation component 432. The continuous evaluation component 432 periodically evaluates idle governor assignments for each CPU based on inputs. The inputs include both a sleep length 434 and inputs provided by input variables 436. Example inputs from the input variables 436 include CPU type, CPU frequency, CPU hardware input, CPU utilization, CPU private cache size, cluster cache hit and miss ratio, application execution context, and battery state.

As discussed, one of the input variables 436 may include CPU type. For example, some CPUs are characterized as medium or large, where large CPUs use more power but offer a higher computational output than medium CPUs. Further, some CPUs are characterized as silver, gold, or prime, where prime CPUs use more power but offer a higher computational output than silver CPUs, while gold CPUs are a middle ground in terms of power demand and computational output. Large CPUs and prime CPUs tend to spend more time and/or power entering deep idle states compared to small CPUs and silver CPUs. For example, a large CPU may have a larger private cache. The large CPU may specify flushing the private cache each time the large CPU enters a deep idle state. Therefore, it may be beneficial for large CPUs to avoid deep idle states, such as the C4 idle state.

If the continuous evaluation component 432 evaluates a governor assignment for a medium CPU or a silver CPU, the continuous evaluation component 432 may be more likely to select an idle governor associated with frequent CPU idling and/or deeper idle states. If the continuous evaluation component 432 evaluates a governor assignment for a large CPU or a prime CPU, the continuous evaluation component 432 may be more likely to select an idle governor that is skewed toward less frequent CPU idling and/or shallower idle states, such as the C1 idle state. Additionally, in some systems, some CPUs are more likely to receive asynchronous wakeup events as compared to other CPUs. The continuous evaluation component 432 may be more likely to select a TEO governor for CPUs that are more likely to be woken up by timer events and less likely to be woken up by other asynchronous wakeup events.

Another one of the input variables 436 may include CPU frequency. For instance, some CPUs may share frequencies because they share a phase-locked loop (PLL). The continuous evaluation component 432 may receive a frequency of a subset of CPUs sharing a PLL and/or power rail and may attempt to use a same or similar idle governor for CPUs sharing a PLL or a power rail. The input variables 436 may also include CPU hardware input. For example, a temperature sensor (TSENS) may provide temperature information for a CPU. If the temperature of the CPU exceeds a threshold, the continuous evaluation component 432 may be more likely to select a simpler idle governor for the CPU. For instance, the continuous evaluation component 432 may select an idle governor that is likely to spend less energy and/or time to determine an idle state. Similarly, in response to the temperature of a CPU exceeding a threshold, the continuous evaluation component 432 may select an idle governor that is more likely to enter deeper idle states than other idle governors.

Another one of the input variables 436 may include CPU utilization. For instance, the continuous evaluation component 432 may select a governor for a CPU based on how busy the CPU is. If a CPU utilization is above a threshold, the continuous evaluation component 432 may be more likely to select an idle governor that is skewed toward shallower idle states because the CPU is likely to spend less time in an idle state before waking. For example, if a CPU is above ninety percent utilization, the continuous evaluation component 432 may select an idle governor that is more likely to specify shallower idle states. Similarly, if the CPU utilization is below a threshold, the continuous evaluation component 432 may be more likely to select an idle governor that is skewed toward deeper idle states.

The input variables 436 may additionally include CPU private cache size. For example, some CPUs have a private level one (L1) cache, but share a level two (L2) cache with other CPUs. The continuous evaluation component 432 may be configured to select or be skewed toward selecting a same idle governor for CPUs sharing a cache, such that CPUs sharing a cache also have a same idle governor. Similarly, the continuous evaluation component 432 may be configured to select or be skewed toward selecting a different idle governor for CPUs not sharing a cache.

The input variables 436 may further include cluster cache hit and miss ratio. In some implementations, CPUs share a level three (L3) cache. For instance, each of the CPU 0 420a, CPU 1 420b, CPU 2 420c, CPU 3 420d, and CPU X 420e may share a L3 cache. If one or more of the CPUs have a cache hit and miss ratio below a threshold (e.g., a CPU incurs many cache misses and often fetches data from system memory), the continuous evaluation component 432 may be configured to select or be skewed toward selecting idle governors associated with shallower idle states.

For example, the continuous evaluation component 432 may select a TEO idle governor for a CPU that has a low cache hit and miss ratio if the TEO idle governor specifies shallower idle states than a current idle governor of the CPU. Similarly, the continuous evaluation component 432 may select a TEO idle governor for a first CPU that shares a cache or a cluster with a second CPU, if the second CPU has a low cache hit and miss ratio and the TEO idle governor specifies shallower idle states than a current idle governor of the first CPU. Selecting shallow sleep states for CPUs in a cluster associated with a low cache hit and miss ratio may help prevent the CPUs from flushing the cache during a deep idle state and therefore incurring additional system memory waiting penalties for itself or other CPUs in the cluster.

The input variables 436 may also include application execution context foreground/background. For example, an application may play music in the background when the phone display is off, e.g., playing music with phone speakers or a wireless speaker. When the display turns back on, the idle governor can be updated accordingly. Similarly, when certain applications publish the type (e.g., game), the idle governor can be updated accordingly when such applications are running.

The input variables 436 may also include battery state. In some implementations, if a system battery level is below a threshold, the continuous evaluation component 432 may be more likely to select idle governors that specify deeper idle states. Further, the continuous evaluation component 432 may select a deep idle governor from the set of available idle governors based on a battery level being less than a threshold, the deep idle governor comprising a deeper idle state than a current idle governor. For instance, if a system battery level is below a threshold, the continuous evaluation component 432 may select a menu governor for a CPU currently implementing a TEO governor, when the menu governor is more likely to select deeper idle states than the TEO governor. Selecting governors that implement deeper idle states may reduce system battery consumption. A simple, aggressive LPM governor may be selected. When the battery is lower, other governors like menu selection methods should be avoided because these other governors generally invoke predictions, and/or track past history. The simple, aggressive LPM governor immediately enters deeper idle states based on a current sleep duration.

As shown in FIG. 4, the continuous evaluation component 432 also receives the sleep length 434 from each of the each of the CPU 0 420a, CPU 1 420b, CPU 2 420c, CPU 3 420d, and CPU X 420e. The sleep length 434 may be the time between a CPU entering an idle state and exiting an idle state. The continuous evaluation component 432 may select an idle governor for one or more CPUs based on the sleep length 434. Further, the continuous evaluation component 432 may select a different idle governor based on differences between a past sleep length and a past target residency associated with a respective CPU.

For instance, CPU 0 420a may have a target residency, or a minimum duration that the CPU should remain in a specific idle state to achieve energy savings greater than the overhead of entering and exiting that idle state. If the sleep length for CPU 0 420a is below the target residency, or if the sleep length for CPU 0 420a is below the target residency for a specified quantity of times during a period, the continuous evaluation component 432 may select a new idle governor for CPU 0 420a. For example, the continuous evaluation component 432 may select an idle governor for CPU 0 420a that specifies a shallower sleep state than the current idle governor for CPU 0 420a.

As discussed, the continuous evaluation component 432 periodically evaluates governor selections for each CPU. For example, the continuous evaluation component 432 may select a governor for one or more of the CPU 0 420a, CPU 1 420b, CPU 2 420c, CPU 3 420d, and CPU X 420e every two seconds. After the continuous evaluation component 432 selects a governor for a CPU, a governor update component 438 changes the governor for the CPU to the governor selected by the continuous evaluation component 432 if the governor selected by the continuous evaluation component 432 is different than the CPU's current governor. By selecting and updating governors during runtime, the continuous evaluation component 432 and the governor update component 438 dynamically adapt governor assignments after the governor selection component 416 initially assigns registered governors at boot time.

The continuous evaluation component 432 may receive input from the user space 430, kernel 400, or any other system domain. In the example illustrated in FIG. 4, the continuous evaluation component 432 receives the sleep length 434 from each of the CPU 0 420a, CPU 1 420b, CPU 2 420c, CPU 3 420d, and CPU X 420c. The continuous evaluation component 432 also receives input from the input variables 436. Other implementations are contemplated. For instance, the continuous evaluation component 432 may receive hardware input from the kernel 400.

The governor update component 438 may additionally select an updated idle governor from the set of available idle governors based on a set of past configurations, each past configuration including a past use case, an idle governor arrangement, and a performance indication. For example, in a first configuration, the system is rendering video and the CPU 0 420a implements a menu governor while the remaining CPU 1 420b, CPU 2 420c, CPU 3 420d, and CPU X 420e implement a TEO governor. In a second configuration, the system is rendering video and the CPU 1 420b implements a QCOM governor while the remaining CPU 0 420a, CPU 2 420c, CPU 3 420d, and CPU X 420e implement a menu governor. In the configuration shown in FIG. 4, the CPU 0 420a implements a QCOM governor, the CPU 1 420a and CPU 2 420c implement a menu governor, the CPU 3 420d implements a QCOM governor, and the CPU X 420e implements a TEO governor.

If the governor update component 438 selects governors during a configuration that includes a video rendering use case, the governor update component 438 may select governors based on performance metrics of the first and second configurations. The performance metrics may include, for example, sleep length, power usage, or computational output. For instance, if the first configuration is associated with less power usage than the second configuration, the governor update component 438 may select governors based on the governor arrangement of the first configuration. For example, the governor update component 438 may select governors matching the governor arrangement of the first configuration, where the governor arrangement includes the governors implemented by each CPU during the first configuration. Other examples of use cases include game processing, audio processing, or a combination of tasks.

Figure 5:
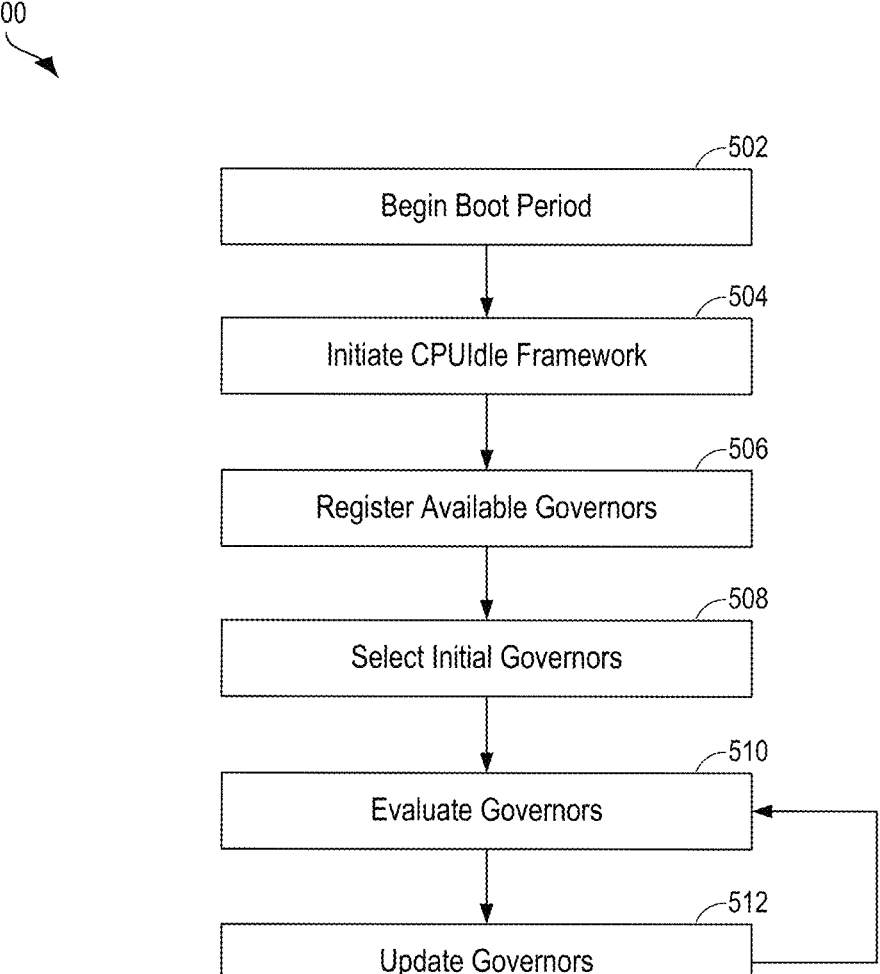
FIG. 5 is a flowchart illustrating an adaptive CPU idle governor selection process, in accordance with various aspects of the present disclosure.

FIG. 5 is a flowchart illustrating an adaptive CPU idle governor selection process 500, in accordance with various aspects of the present disclosure. The process 500 may be implemented by, for example, a computer system having multiple CPUs. At block 502, the process 500 begins with a boot period. The system powers on and begins a system initialization sequence. The system may execute a bootloader and may load an operating system kernel into memory. The system may also perform basic hardware checks.

At block 504, the process 500 initiates a CPUIdle framework. The CPUIdle framework is responsible for managing initial CPU governor assignments. The CPUIdle framework prepares to register available governors. At block 506, the process 500 registers available governors. The system identifies and registers multiple idle governors available for selection. Each governor receives a fixed rating, where the fixed rating may be based on the system's power management policies and workload specifications. At block 508, the process 500 selects initial governors. The system selects an available idle governor and assigns the governor to CPUs in the system. All CPUs in the system receive the governor having the highest fixed rating.

At block 510, the process 500 evaluates governors. In some implementations, a continuous evaluation component, such as the continuous evaluation component 432 illustrated with respect to FIG. 4, may select governors based on inputs. In some examples, the continuous evaluation component 432 may select a shallow idle governor from the set of available idle governors based on a utilization indication exceeding a threshold, the shallow idle governor comprising a shallower idle state than a current idle governor. For instance, the continuous evaluation component 432 may receive an input indicating that a CPU's utilization is above a threshold. Based on the input, the continuous evaluation component 432 may select an idle governor that is associated with shallow sleep states or is more associated with shallow sleep states than the CPU's current governor.

At block 512, the process 500 updates governors. In some implementations, a governor update component, such as the governor update component 438 illustrated with respect to FIG. 4, may change a CPU governor to a governor selected for the CPU by the continuous evaluation component 432. For instance, the governor update component 438 may transmit a governor update indication to the CPU or the CPUIdle framework, the governor update indication designating a governor for the CPU. After updating governors at block 512, the process 500 may return to block 510 and continue to evaluate governors. In some implementations, the process 500 may wait for a specified period of time, such as three seconds, before transitioning from block 512 to block 510.

FIG. 6 is a flowchart illustrating an example process 600 performed for adaptive selection of CPU idle governors, in accordance with various aspects of the present disclosure. The process 600 may be performed by a UE. In some aspects, the process 600 may include registering a set of central processing unit (CPU) idle governors (block 602). For example, a QCOM governor, a Menu governor, TEO governor, Ladder governor and Haltpoll governor may be registered.

In some aspects, the process 600 may include selecting at boot time, for each CPU of a set of CPUs, an initial CPU idle governor from the set of CPU idle governors based on an initial rating associated with each idle governor (block 604).

In some aspects, the process 600 may include selecting during run time, for each CPU of the set of CPUs, an updated CPU idle governor from the set of CPU idle governors based on at least one CPU input of a set of CPU inputs associated with each CPU (block 606). For example, the set of CPU inputs may include CPU type, CPU frequency, CPU hardware input, CPU utilization, CPU private cache size, cluster cache hit and miss ratio, application execution context, sleep length, and battery state. In some aspects, the selecting based on sleep length includes selecting a different CPU idle governor based on differences between a past sleep length and a past target residency associated with a respective CPU. In some aspects, the selecting based on CPU utilization comprises selecting a shallow CPU idle governor from the set of CPU idle governors based on a utilization indication exceeding a threshold, the shallow CPU idle governor comprising a shallower idle state than a current CPU idle governor. In some aspects, the selecting based on the battery state comprises selecting a deep CPU idle governor from the set of CPU idle governors based on a battery level being less than a threshold, the deep CPU idle governor comprising a deeper idle state than a current CPU idle governor.

Figure 7:
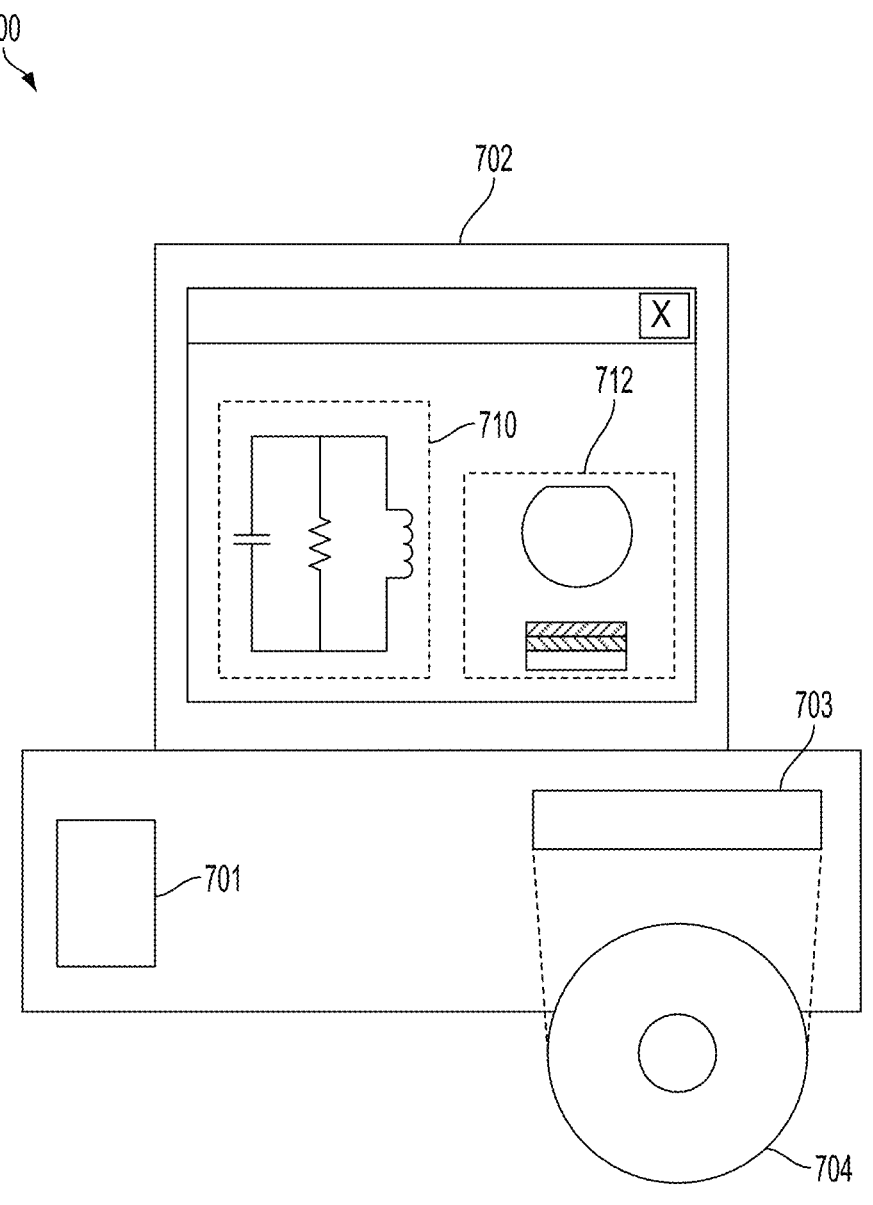
FIG. 7 is a block diagram illustrating a design workstation used for circuit, layout, and logic design of components, in accordance with various aspects of the present disclosure.

FIG. 7 is a block diagram illustrating a design workstation 700 used for circuit, layout, and logic design of a semiconductor component, such as the CPUIdle initializer, disclosed above. The design workstation 700 includes a hard disk 701 containing operating system software, support files, and design software such as Cadence or OrCAD. The design workstation 700 also includes a display 702 to facilitate design of a circuit 710 or a semiconductor component 712, such as the CPUIdle initializer. A storage medium 704 is provided for tangibly storing the design of the circuit 710 or the semiconductor component 712 (e.g., the CPUIdle initializer). The design of the circuit 710 or the semiconductor component 712 may be stored on the storage medium 704 in a file format such as GDSII or GERBER. The storage medium 704 may be a CD-ROM, DVD, hard disk, flash memory, or other appropriate device. Furthermore, the design workstation 700 includes a drive apparatus 703 for accepting input from or writing output to the storage medium 704.

Data recorded on the storage medium 704 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 704 facilitates the design of the circuit 710 or the semiconductor component 712 by decreasing the number of processes for designing semiconductor wafers.

Example Aspects

Aspect 1: A method, comprising: registering a set of central processing unit (CPU) idle governors; selecting at boot time, for each CPU of a set of CPUs, an initial CPU idle governor from the set of CPU idle governors based on an initial rating associated with each idle governor; and selecting during run time, for each CPU of the set of CPUs, an updated CPU idle governor from the set of CPU idle governors based on at least one CPU input of a set of CPU inputs associated with each CPU.

Aspect 2: The method of Aspect 1, in which the set of CPU inputs includes CPU type, CPU frequency, CPU hardware input, CPU utilization, CPU private cache size, cluster cache hit and miss ratio, application execution context, sleep length, and battery state.

Aspect 3: The method of Aspect 1 or 2, in which CPU frequency comprises a frequency of a subset of CPUs sharing a phase-locked loop and/or power rail.

Aspect 4: The method of any of the preceding Aspects, in which selecting during run time, for each CPU of the set of CPUs, the updated CPU idle governor from the set of CPU idle governors based on sleep length comprises selecting a different CPU idle governor based on differences between a past sleep length and a past target residency associated with a respective CPU.

Aspect 5: The method of any of the preceding Aspects, in which selecting during run time, for each CPU of the set of CPUs, the updated CPU idle governor from the set of CPU idle governors based on CPU utilization comprises selecting a shallow CPU idle governor from the set of CPU idle governors based on a utilization indication exceeding a threshold, the shallow CPU idle governor comprising a shallower idle state than a current CPU idle governor.

Aspect 6: The method of any of the preceding Aspects, in which selecting during run time, for each CPU of the set of CPUs, the updated CPU idle governor from the set of CPU idle governors based on the battery state comprises selecting a deep CPU idle governor from the set of CPU idle governors based on a battery level being less than a threshold, the deep CPU idle governor comprising a deeper idle state than a current CPU idle governor.

Aspect 7: The method of any of the preceding Aspects, further comprising selecting, for each CPU of the set of CPUs, the updated CPU idle governor from the set of CPU idle governors based on a set of past configurations, each past configuration including a past use case, a CPU idle governor arrangement, and a performance indication.

Aspect 8: An apparatus, comprising: at least one memory; and at least one processor coupled to the at least one memory, the at least one processor configured: to register a set of central processing unit (CPU) idle governors; to select at boot time, for each CPU of a set of CPUs, an initial CPU idle governor from the set of CPU idle governors based on an initial rating associated with each idle governor; and to select during run time, for each CPU of the set of CPUs, an updated CPU idle governor from the set of CPU idle governors based on at least one CPU input of a set of CPU inputs associated with each CPU.

Aspect 9: The apparatus of Aspect 8, in which the set of CPU inputs includes CPU type, CPU frequency, CPU hardware input, CPU utilization, CPU private cache size, cluster cache hit and miss ratio, application execution context, sleep length, and battery state.

Aspect 10: The apparatus of Aspect 8 or 9, in which CPU frequency comprises a frequency of a subset of CPUs sharing a phase-locked loop and/or power rail.

Aspect 11: The apparatus of any of the Aspects 8-10, in which the at least one processor is further configured to select during run time, for each CPU of the set of CPUs, the updated CPU idle governor from the set of CPU idle governors based on sleep length comprises selecting a different CPU idle governor based on differences between a past sleep length and a past target residency associated with a respective CPU.

Aspect 12: The apparatus of any of the Aspects 8-11, in which the at least one processor is further configured to select during run time, for each CPU of the set of CPUs, the updated CPU idle governor from the set of CPU idle governors based on CPU utilization comprises selecting a shallow CPU idle governor from the set of CPU idle governors based on a utilization indication exceeding a threshold, the shallow CPU idle governor comprising a shallower idle state than a current CPU idle governor.

Aspect 13: The apparatus of any of the Aspects 8-12, in which the at least one processor is further configured to select during run time, for each CPU of the set of CPUs, the updated CPU idle governor from the set of CPU idle governors based on the battery state comprises selecting a deep CPU idle governor from the set of CPU idle governors based on a battery level being less than a threshold, the deep CPU idle governor comprising a deeper idle state than a current CPU idle governor.

Aspect 14: The apparatus of any of the Aspects 8-13, in which the at least one processor is further configured to select, for each CPU of the set of CPUs, the updated CPU idle governor from the set of CPU idle governors based on a set of past configurations, each past configuration including a past use case, a CPU idle governor arrangement, and a performance indication.

Aspect 15: A non-transitory computer-readable medium having program code recorded thereon, the program code executed by a processor and comprising: program code to register a set of central processing unit (CPU) governors; program code to select at boot time, for each CPU of a set of CPUs, an initial CPU idle governor from the set of CPU idle governors based on an initial rating associated with each idle governor; and program code to select during run time, for each CPU of the set of CPUs, an updated CPU idle governor from the set of CPU idle governors based on at least one CPU input of a set of CPU inputs associated with each CPU.

Aspect 16: The non-transitory computer-readable medium of Aspect 15, in which the set of CPU inputs includes CPU type, CPU frequency, CPU hardware input, CPU utilization, CPU private cache size, cluster cache hit and miss ratio, application execution context, sleep length, and battery state.

Aspect 17: The non-transitory computer-readable medium of Aspect 15 or 16, in which CPU frequency comprises a frequency of a subset of CPUs sharing a phase-locked loop and/or power rail.

Aspect 18: The non-transitory computer-readable medium of any of the Aspects 15-17, in which the program code comprises program code to select during run time, for each CPU of the set of CPUs, the updated CPU idle governor from the set of CPU idle governors based on sleep length comprises selecting a different CPU idle governor based on differences between a past sleep length and a past target residency associated with a respective CPU.

Aspect 19: The non-transitory computer-readable medium of any of the Aspects 15-18, in which the program code comprises program code to select during run time, for each CPU of the set of CPUs, the updated CPU idle governor from the set of CPU idle governors based on CPU utilization comprises selecting a shallow CPU idle governor from the set of CPU idle governors based on a utilization indication exceeding a threshold, the shallow CPU idle governor comprising a shallower idle state than a current CPU idle governor.

Aspect 20: The non-transitory computer-readable medium of any of the Aspects 15-19, in which the program code comprises program code to select during run time, for each CPU of the set of CPUs, the updated CPU idle governor from the set of CPU idle governors based on the battery state comprises selecting a deep CPU idle governor from the set of CPU idle governors based on a battery level being less than a threshold, the deep CPU idle governor comprising a deeper idle state than a current CPU idle governor.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/ or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method, comprising:
registering a set of central processing unit (CPU) idle governors;
selecting at boot time, for each CPU of a set of CPUs, an initial CPU idle governor from the set of CPU idle governors based on an initial rating associated with each idle governor; and
selecting during run time, for each CPU of the set of CPUs, an updated CPU idle governor from the set of CPU idle governors based on at least one CPU input of a set of CPU inputs associated with each CPU.

2. The method of claim 1, in which the set of CPU inputs includes CPU type, CPU frequency, CPU hardware input, CPU utilization, CPU private cache size, cluster cache hit and miss ratio, application execution context, sleep length, and battery state.

3. The method of claim 2, in which CPU frequency comprises a frequency of a subset of CPUs sharing a phase-locked loop and/or power rail.

4. The method of claim 2, in which selecting during run time, for each CPU of the set of CPUs, the updated CPU idle governor from the set of CPU idle governors based on sleep length comprises selecting a different CPU idle governor based on differences between a past sleep length and a past target residency associated with a respective CPU.

5. The method of claim 2, in which selecting during run time, for each CPU of the set of CPUs, the updated CPU idle governor from the set of CPU idle governors based on CPU utilization comprises selecting a shallow CPU idle governor from the set of CPU idle governors based on a utilization indication exceeding a threshold, the shallow CPU idle governor comprising a shallower idle state than a current CPU idle governor.

6. The method of claim 2, in which selecting during run time, for each CPU of the set of CPUs, the updated CPU idle governor from the set of CPU idle governors based on the battery state comprises selecting a deep CPU idle governor from the set of CPU idle governors based on a battery level being less than a threshold, the deep CPU idle governor comprising a deeper idle state than a current CPU idle governor.

7. The method of claim 1, further comprising selecting, for each CPU of the set of CPUs, the updated CPU idle governor from the set of CPU idle governors based on a set of past configurations, each past configuration including a past use case, a CPU idle governor arrangement, and a performance indication.

8. An apparatus, comprising:
at least one memory; and
at least one processor coupled to the at least one memory, the at least one processor configured:
to register a set of central processing unit (CPU) idle governors;
to select at boot time, for each CPU of a set of CPUs, an initial CPU idle governor from the set of CPU idle governors based on an initial rating associated with each idle governor; and
to select during run time, for each CPU of the set of CPUs, an updated CPU idle governor from the set of CPU idle governors based on at least one CPU input of a set of CPU inputs associated with each CPU.

9. The apparatus of claim 8, in which the set of CPU inputs includes CPU type, CPU frequency, CPU hardware input, CPU utilization, CPU private cache size, cluster cache hit and miss ratio, application execution context, sleep length, and battery state.

10. The apparatus of claim 9, in which CPU frequency comprises a frequency of a subset of CPUs sharing a phase-locked loop and/or power rail.

11. The apparatus of claim 9, in which the at least one processor is further configured to select during run time, for each CPU of the set of CPUs, the updated CPU idle governor from the set of CPU idle governors based on sleep length comprises selecting a different CPU idle governor based on differences between a past sleep length and a past target residency associated with a respective CPU.

12. The apparatus of claim 9, in which the at least one processor is further configured to select during run time, for each CPU of the set of CPUs, the updated CPU idle governor from the set of CPU idle governors based on CPU utilization comprises selecting a shallow CPU idle governor from the set of CPU idle governors based on a utilization indication exceeding a threshold, the shallow CPU idle governor comprising a shallower idle state than a current CPU idle governor.

13. The apparatus of claim 9, in which the at least one processor is further configured to select during run time, for each CPU of the set of CPUs, the updated CPU idle governor from the set of CPU idle governors based on the battery state comprises selecting a deep CPU idle governor from the set of CPU idle governors based on a battery level being less than a threshold, the deep CPU idle governor comprising a deeper idle state than a current CPU idle governor.

14. The apparatus of claim 8, in which the at least one processor is further configured to select, for each CPU of the set of CPUs, the updated CPU idle governor from the set of CPU idle governors based on a set of past configurations, each past configuration including a past use case, a CPU idle governor arrangement, and a performance indication.

15. A non-transitory computer-readable medium having program code recorded thereon, the program code executed by a processor and comprising:
program code to register a set of central processing unit (CPU) idle governors;
program code to select at boot time, for each CPU of a set of CPUs, an initial CPU idle governor from the set of CPU idle governors based on an initial rating associated with each idle governor; and program code to select during run time, for each CPU of the set of CPUs, an updated CPU idle governor from the set of CPU idle governors based on at least one CPU input of a set of CPU inputs associated with each CPU.

16. The non-transitory computer-readable medium of claim 15, in which the set of CPU inputs includes CPU type, CPU frequency, CPU hardware input, CPU utilization, CPU private cache size, cluster cache hit and miss ratio, application execution context, sleep length, and battery state.

17. The non-transitory computer-readable medium of claim 16, in which CPU frequency comprises a frequency of a subset of CPUs sharing a phase-locked loop and/or power rail.

18. The non-transitory computer-readable medium of claim 16, in which the program code comprises program code to select during run time, for each CPU of the set of CPUs, the updated CPU idle governor from the set of CPU idle governors based on sleep length comprises selecting a different CPU idle governor based on differences between a past sleep length and a past target residency associated with a respective CPU.

19. The non-transitory computer-readable medium of claim 16, in which the program code comprises program code to select during run time, for each CPU of the set of CPUs, the updated CPU idle governor from the set of CPU idle governors based on CPU utilization comprises selecting a shallow CPU idle governor from the set of CPU idle governors based on a utilization indication exceeding a threshold, the shallow CPU idle governor comprising a shallower idle state than a current CPU idle governor.

20. The non-transitory computer-readable medium of claim 16, in which the program code comprises program code to select during run time, for each CPU of the set of CPUs, the updated CPU idle governor from the set of CPU idle governors based on the battery state comprises selecting a deep CPU idle governor from the set of CPU idle governors based on a battery level being less than a threshold, the deep CPU idle governor comprising a deeper idle state than a current CPU idle governor.

* * * * *